(12) United States Patent
Inoue

(10) Patent No.: US 11,840,231 B2
(45) Date of Patent: Dec. 12, 2023

(54) VEHICLE DISPATCH SUPPORT SYSTEM, VEHICLE DISPATCH SUPPORT METHOD, AND NON-TRANSITORY RECORDING MEDIUM

(71) Applicant: TOYOTA JIDOSHA KABUSHIKI KAISHA, Toyota (JP)

(72) Inventor: Haruki Inoue, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 86 days.

(21) Appl. No.: 17/581,073

(22) Filed: Jan. 21, 2022

(65) Prior Publication Data
US 2022/0234584 A1 Jul. 28, 2022

(30) Foreign Application Priority Data
Jan. 25, 2021 (JP) .................................. 2021-009722

(51) Int. Cl.
*B60W 30/18* (2012.01)
*B60W 40/105* (2012.01)

(52) U.S. Cl.
CPC .... *B60W 30/18109* (2013.01); *B60W 40/105* (2013.01); *B60W 2510/182* (2013.01)

(58) Field of Classification Search
CPC ......... B60W 30/18109; B60W 40/105; B60W 2510/182; B60W 2540/30; B60W 2556/10; G06Q 10/0639
See application file for complete search history.

(56) References Cited

U.S. PATENT DOCUMENTS

| | | | |
|---|---|---|---|
| 11,059,494 B1* | 7/2021 | Chan ................. | B60W 50/0098 |
| 2017/0267256 A1* | 9/2017 | Minster ............. | G01C 21/3461 |
| 2020/0393258 A1* | 12/2020 | Leone ................ | G01C 21/3492 |
| 2022/0021737 A1* | 1/2022 | Fan ........................ | B60G 17/02 |

FOREIGN PATENT DOCUMENTS

| | | |
|---|---|---|
| JP | 2007-238058 A | 9/2007 |
| JP | 2012-196998 A | 10/2012 |
| JP | 2019-219828 A | 12/2019 |

* cited by examiner

*Primary Examiner* — Peter D Nolan
*Assistant Examiner* — Anwar Mohamed
(74) *Attorney, Agent, or Firm* — Dinsmore & Shohl LLP

(57) ABSTRACT

A vehicle dispatch support system includes a recording section at which comparison vehicle sensitivity information and candidate vehicle sensitivity information are recorded, the comparison vehicle sensitivity information being information relating to a driving sensitivity of a comparison vehicle that is a vehicle that a user has ridden in the past, and the candidate vehicle sensitivity information being information relating to a driving sensitivity of each of a plurality of candidate vehicles, a processor coupled to the recording section and configured to compute a sensitivity difference, which is a difference between the driving sensitivity expressed by the comparison vehicle sensitivity information and the driving sensitivity expressed by the candidate vehicle sensitivity information, and a display section configured to display sensitivity difference-related information, which is information based on the sensitivity difference.

5 Claims, 11 Drawing Sheets

| VEHICLE ID | NUMBER OF TIMES RIDDEN | MOST RECENTLY RIDDEN DATE | EVALUATION |
|---|---|---|---|
| 100 | X TIMES | MM/DD/YYYY | 1 |

| VEHICLE ID | VEHICLE BEHAVIOR SIMILARITY LEVEL | WAIT TIME | RECOMMENDATION LEVEL | SELECT BUTTON |
|---|---|---|---|---|
| 200 (VEHICLE A20) | SIMILAR | 10 MINUTES | 1 | ● |
| 300 (VEHICLE B20) | NOT SIMILAR | 7 MINUTES | 2 | ○ |

| VEHICLE ID | VEHICLE BEHAVIOR SIMILARITY LEVEL | WAIT TIME | RECOMMENDATION LEVEL | SELECT BUTTON |
|---|---|---|---|---|
| 200 (VEHICLE A20) | SIMILAR | 10 MINUTES | 2 | ○ |
| 300 (VEHICLE B20) | NOT SIMILAR | 7 MINUTES | 1 | ● |

VEHICLE DISPATCH SUPPORT SYSTEM, VEHICLE DISPATCH SUPPORT METHOD, AND NON-TRANSITORY RECORDING MEDIUM

CROSS-REFERENCE TO RELATED APPLICATION

This application is based on and claims priority under 35 USC 119 from Japanese Patent Application No. 2021-009722 filed on Jan. 25, 2021, the disclosure of which is incorporated by reference herein.

BACKGROUND

Technical Field

The present disclosure relates to a vehicle dispatch support system, a vehicle dispatch support method, and a non-transitory recording medium.

Related Art

Japanese Patent Application Laid-Open (JP-A) No. 2019-219828 discloses a system able to execute processing to allow a user to rent a vehicle using a mobile terminal.

The system of JP-A No. 2019-219828 does not take into account whether or not a driving sensitivity of a vehicle that the user intends to rent is appropriate for the user. The system of JP-A No. 2019-219828 therefore leaves room for improvement regarding this point.

In consideration of the above circumstances, an object of the present disclosure is to obtain a vehicle dispatch support system, a vehicle dispatch support method, and a non-transitory recording medium that enable a user to select a vehicle with a driving sensitivity appropriate for the user.

SUMMARY

A vehicle dispatch support system according to a first aspect of the present disclosure includes a recording section, a processor, and a display section. The recording section at which comparison vehicle sensitivity information and candidate vehicle sensitivity information are recorded. The comparison vehicle sensitivity information is information relating to a driving sensitivity of a comparison vehicle that is a vehicle that a user has ridden in the past. The candidate vehicle sensitivity information is information relating to a driving sensitivity of each of a plurality of candidate vehicles. The processor is coupled to the recording section and is configured to compute a sensitivity difference, which is a difference between the driving sensitivity expressed by the comparison vehicle sensitivity information and the driving sensitivity expressed by the candidate vehicle sensitivity information. The display section is configured to display sensitivity difference-related information, which is information based on the sensitivity difference.

The processor of the vehicle dispatch support system according to the first aspect of the present disclosure computes the sensitivity difference that is the difference between the driving sensitivity expressed by the comparison vehicle sensitivity information and the driving sensitivity expressed by the candidate vehicle sensitivity information. The comparison vehicle sensitivity information and the candidate vehicle sensitivity information are recorded in the recording section. The display section displays the sensitivity difference-related information that is information based on the sensitivity difference. Thus, the user looking at the display section is able to select a vehicle with a driving sensitivity likely to be appropriate for the user from amongst the candidate vehicles based on the driving sensitivity of the comparison vehicle that is a vehicle that the user has ridden in the past.

In a vehicle dispatch support system according to a second aspect of the present disclosure, the processor is configured to compute the sensitivity difference as a difference between acceleration sensitivities expressing respective correlations between accelerator position and acceleration of the comparison vehicle and the candidate vehicles.

In the vehicle dispatch support system according to the second aspect of the present disclosure, the processor computes the sensitivity difference as the difference between acceleration sensitivities expressing respective correlations between accelerator position and acceleration of the comparison vehicle and the candidate vehicles. Thus, the user looking at the display section is able to select a vehicle with an acceleration sensitivity likely to be appropriate for the user from amongst the candidate vehicles based on the acceleration sensitivity of the comparison vehicle.

In a vehicle dispatch support system according to a third aspect of the present disclosure, the processor is configured to compute the sensitivity difference by employing a weighting coefficient that is set for each of plural non-overlapping ranges of accelerator position.

In the vehicle dispatch support system according to the third aspect of the present disclosure, the processor computes the sensitivity difference by employing the weighting coefficient that is set for each of the plural accelerator position ranges. By setting the weighting coefficients to suitable values in this manner, the sensitivity difference computed by the processor is more useful to the user. This increases the likelihood of the user looking at the display section selecting a vehicle with an acceleration sensitivity likely to be appropriate for the user from amongst the candidate vehicles.

In a vehicle dispatch support system according to a fourth aspect of the present disclosure, the processor is configured to compute the sensitivity difference as a difference between deceleration sensitivities expressing respective correlations between brake pressing force and deceleration of the comparison vehicle and the candidate vehicles.

In the vehicle dispatch support system according to the fourth aspect of the present disclosure, the processor computes the sensitivity difference as the difference between deceleration sensitivities expressing respective correlations between brake pressing force and deceleration of the comparison vehicle and the candidate vehicles. Thus, the user looking at the display section is able to select a vehicle with a deceleration sensitivity likely to be appropriate for the user from amongst the candidate vehicles based on the deceleration sensitivity of the comparison vehicle.

In a vehicle dispatch support system according to a fifth aspect of the present disclosure, the processor is configured to compute the sensitivity difference by employing a weighting coefficient that is set for each of plural non-overlapping ranges of brake pressing force.

In the vehicle dispatch support system according to the fifth aspect of the present disclosure, the processor computes the sensitivity difference by employing the weighting coefficient that is set for each of the plural brake pressing force ranges. By setting the weighting coefficients to suitable values in this manner, the sensitivity difference computed by the processor is more useful to the user. This increases the likelihood of the user looking at the display section selecting a vehicle with a deceleration sensitivity likely to be appropriate for the user from amongst the candidate vehicles.

In a vehicle dispatch support system according to a sixth aspect of the present disclosure, the processor is configured to compute plural of the sensitivity differences based on the driving sensitivity expressed by the comparison vehicle sensitivity information and on the driving sensitivity expressed by the candidate vehicle sensitivity information of the plural candidate vehicles. The display section is configured to display recommendation information as the sensitivity difference-related information, the recommendation information being generated based on the plural computed sensitivity differences and indicating which of the candidate vehicles is being recommended to the user.

In the vehicle dispatch support system according to the sixth aspect of the present disclosure, the display section displays the recommendation information indicating which of the candidate vehicles is being recommended to the user. The recommendation information is configured by the sensitivity difference-related information that is based on the plural sensitivity differences computed by the processor. Thus, the user is able to identify the vehicle with a driving sensitivity that is appropriate for the user by looking at the display section.

In a vehicle dispatch support system according to a seventh aspect of the present disclosure, in cases in which an evaluation result of the comparison vehicle by the user is a predetermined evaluation level or higher, the candidate vehicles are more readily recommended to the user, the smaller the sensitivity difference.

In the vehicle dispatch support system according to the seventh aspect of the present disclosure, in cases in which the evaluation result of the comparison vehicle by the user is the predetermined evaluation level or higher, the candidate vehicles are more readily recommended to the user, the smaller the sensitivity difference. There is accordingly a high likelihood of the user selecting a vehicle with a similar driving sensitivity to the comparison vehicle that the user has evaluated highly in the past from amongst the candidate vehicles.

A vehicle dispatch support method according to an eighth aspect of the present disclosure includes, using a processor, computing a sensitivity difference, which is a difference between a driving sensitivity of a comparison vehicle that is a vehicle that a user has ridden in the past and a driving sensitivity of each of a plurality of vehicles serving as candidate vehicles; and displaying, at a display section, sensitivity difference-related information, which is information based on the sensitivity difference.

As described above, the vehicle dispatch support system, vehicle dispatch support method, and non-transitory recording medium according to the present disclosure exhibit an effect of enabling the user to select a vehicle with a driving sensitivity appropriate for the user.

BRIEF DESCRIPTION I/F THE DRAWINGS

Exemplary embodiments of the present disclosure will be described in detail based on the following figures, wherein.

DETAILED DESCRIPTION

First Exemplary Embodiment

Explanation follows regarding a first exemplary embodiment of a vehicle dispatch support system 10 (referred to hereafter simply as the "system 10"), a vehicle dispatch support method, and a non-transitory recording medium according to the present disclosure, with reference to the drawings.

Figure 1:
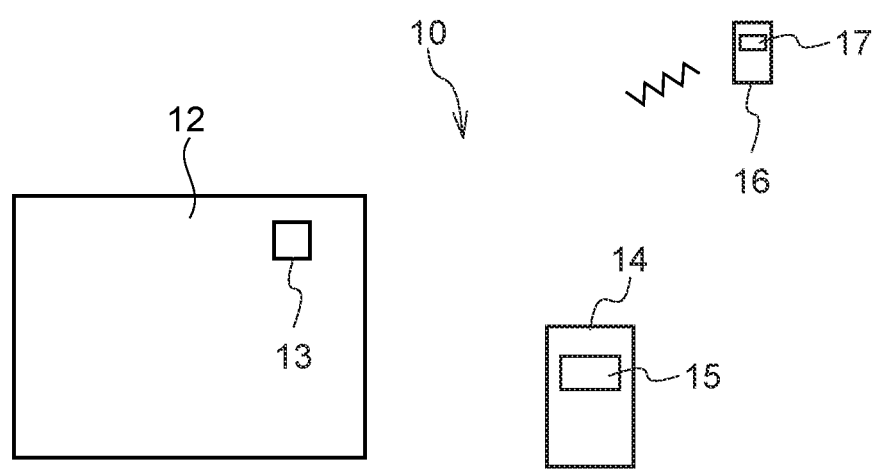
FIG. 1 is a diagram illustrating an overall vehicle dispatch support system according to a first exemplary embodiment.

FIG. 1 illustrates an overall configuration of the system 10 of the present exemplary embodiment. The system 10 includes a management server 12, an operation terminal 14, and a mobile terminal 16. The management server 12 and the operation terminal 14 are, for example, installed in a premise of a car rental company that owns plural vehicles 20. The mobile terminal 16 is, for example, a smartphone or a tablet computer.

Figure 2:
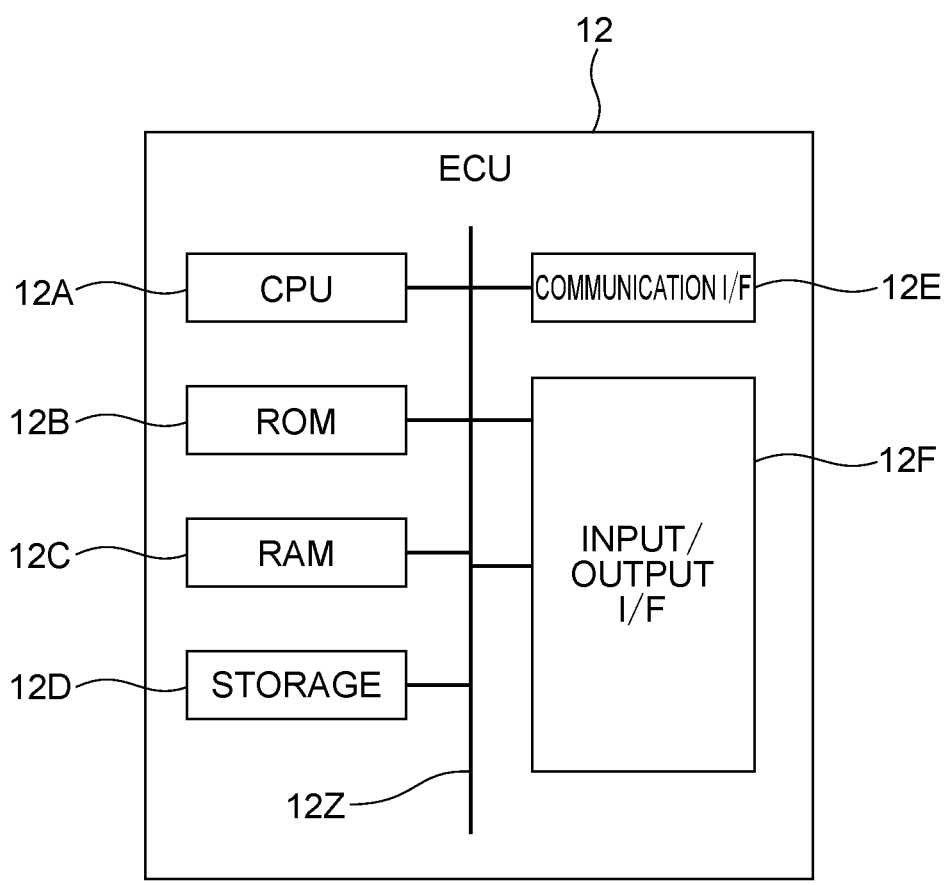
FIG. 2 is a control block diagram of a management server of the vehicle dispatch support system illustrated in FIG. 1.

As illustrated in FIG. 2, the management server 12 is configured including a central processing unit (CPU; a processor) 12A, read only memory (ROM) 12B serving as a non-transitory recording medium (storage medium; recording section), random access memory (RAM) 12C, storage 12D serving as a non-transitory recording medium (storage medium; recording section), a communication interface (I/F) 12E, and an input/output I/F 12F.

The CPU 12A, the ROM 12B, the RAM 12C, the storage 12D, the communication interface I/F 12E, and the input/output I/F 12F are connected together so as to be capable of communicating with each other through a bus 12Z. The management server 12 is capable of acquiring information relating to the date and time from a timer (not illustrated in the drawings).

The CPU 12A is a central processing unit that executes various programs and controls various sections. Namely, the CPU 12A reads a program from the ROM 12B or the storage 12D and executes the program using the RAM 12C as a workspace. The CPU 12A controls various configurations and performs various arithmetic processing according to the program recorded in the ROM 12B or the storage 12D.

The ROM 12B holds various programs and various data. The RAM 12C functions as a workspace to temporarily store programs or other data. The storage 12D is configured by a storage device such as a hard disk drive (HDD) or a solid state drive (SSD), and holds various programs and various data. The communication I/F 12E is an interface through which the management server 12 communicates with other equipment. The input/output I/F 12F is an interface that communicates with various devices. For example, a wireless communication device 13 provided to the management server 12 is connected to the input/output I/F 12F.

The operation terminal 14 is configured including a CPU, a ROM, a RAM, a storage, a communication I/F, and an input/output I/F. The CPU, the ROM, the RAM, the storage, the communication I/F, and the input/output I/F of the operation terminal 14 are connected together so as to be capable of communicating with each other through a bus. The operation terminal 14 is capable of acquiring information relating to the date and time from a timer (not illustrated in the drawings). The operation terminal 14 is provided with a display section 15 including a touch panel. The display section 15 is connected to the input/output I/F of the operation terminal 14.

The communication I/F 12E of the management server 12 and the communication I/F of the operation terminal 14 are connected together over a local area network (LAN).

Figure 3:
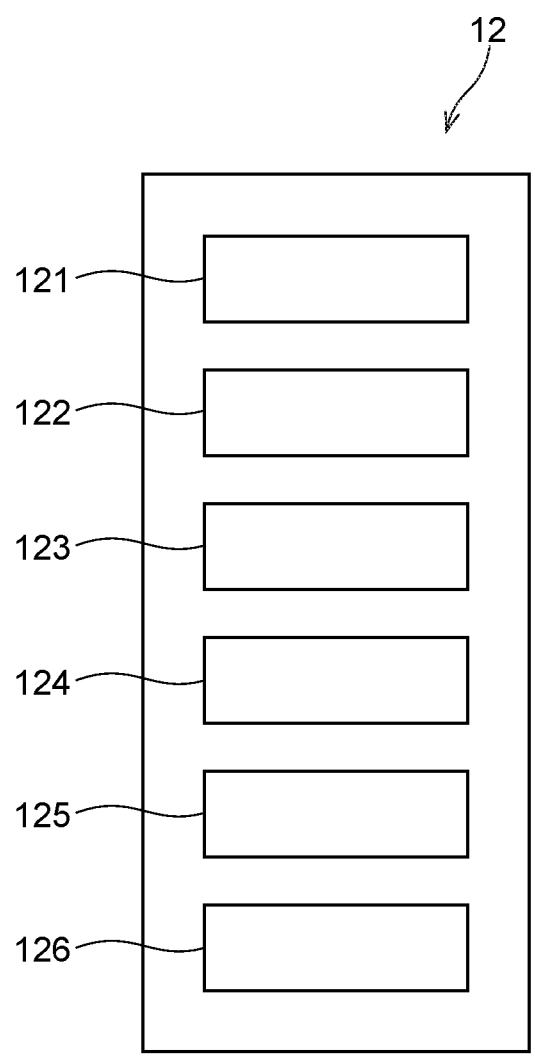
FIG. 3 is a functional block diagram of the management server illustrated in FIG. 2.

FIG. 3 is a block diagram illustrating an example of functional configuration of the management server 12. The management server 12 includes a transmission/reception section 121, a sensitivity computation section 122, a sensitivity difference computation section 123, a wireless control section 124, a wait time computation section 125, and a determination section 126 as functional configuration. The transmission/reception section 121, the sensitivity computation section 122, the sensitivity difference computation section 123, the wireless control section 124, the wait time computation section 125, and the determination section 126 are implemented by the CPU 12A, serving as an example of a processor (computer), reading and executing a program stored in the ROM 12B or the storage 12D, serving as an example of a non-transitory recording medium.

The transmission/reception section 121 transmits and receives information between itself and the operation terminal 14 (transmission/reception section 141) over the LAN.

The sensitivity computation section 122 generates vehicle sensitivity information (comparison vehicle sensitivity information and candidate vehicle sensitivity information), described later, based on vehicle information, described later.

The sensitivity difference computation section 123 computes a sensitivity difference, described later, based on vehicle sensitivity information recorded in the storage 12D.

The wireless control section 124 controls the wireless communication device 13. Namely, the wireless control section 124 controls the wireless communication device 13 in order to execute wireless communication between the wireless communication device 13 and the mobile terminal 16.

Functionality of the wait time computation section 125 and the determination section 126 will be described later.

All of the vehicles 20 owned by the car rental company are assigned a vehicle ID. Moreover, all customers (users) registered with the car rental company are assigned a customer ID. Customer history data 18 created for each customer ID is recorded in the storage 12D of the management server 12 (see FIG. 4). The customer history data 18 records the vehicle IDs of each of the vehicles 20 each customer has used up to the current time, the number of times each of the vehicles has been ridden (driven), a most recently ridden date for each of the vehicles, and a customer evaluation of each of the vehicles. This evaluation is rated on a five-point scale from 1 to 5, with lower numbers representing a more favorable evaluation. Of these evaluations, an evaluation of a predetermined level or higher is considered a "positive evaluation". In the present exemplary embodiment, an evaluation of 1 or 2 is a "positive evaluation", whereas an evaluation of 3 to 5 is a "negative evaluation". A customer uses the display section 15 (touch panel) of the operation terminal 14 or a display section 17 (touch panel), described later, of the mobile terminal 16 to transmit information relating to the evaluation of the vehicle 20 to the transmission/reception section 121 of the management server 12. On receipt of the evaluation-related information, the management server 12 records the information in the customer history data 18 associated with the customer ID corresponding to the customer. The customer corresponding to the customer ID associated with the customer history data 18 illustrated in FIG. 4 has ridden the vehicle 20 with a vehicle ID 100 in the past. In the following explanation, the vehicle 20 with the vehicle ID 100 is also referred to as the vehicle X20 (comparison vehicle).

The storage 12D records information relating to a current usage status (referred to hereafter as "usage status information") of all of the vehicles 20 owned by the car rental company. The usage status information includes information relating to whether or not each of the vehicles 20 is being used by a customer at the current time, and information relating to a wait time until a vehicle 20 being used by a customer reverts to a non-usage state (a standby state). The usage status information is updated in real time according to the current status of each of the vehicles 20.

The mobile terminal 16 illustrated in FIG. 1 is owned by a customer of the system 10. The mobile terminal 16 includes the display section 17, including a touch panel. The mobile terminal 16 is configured including a CPU, a ROM, a RAM, a storage, a communication I/F, and an input/output I/F. The CPU, the ROM, the RAM, the storage, the communication I/F, and the input/output I/F are connected together so as to be capable of communicating with each other through a bus. The mobile terminal 16 is capable of acquiring information relating to the date and time from a timer (not illustrated in the drawings). The mobile terminal 16 is capable of communicating wirelessly with the wireless communication device 13. Moreover, a rental car reservation application, this being software developed by the car rental company, is installed on the mobile terminal 16.

Figures 4, 5:
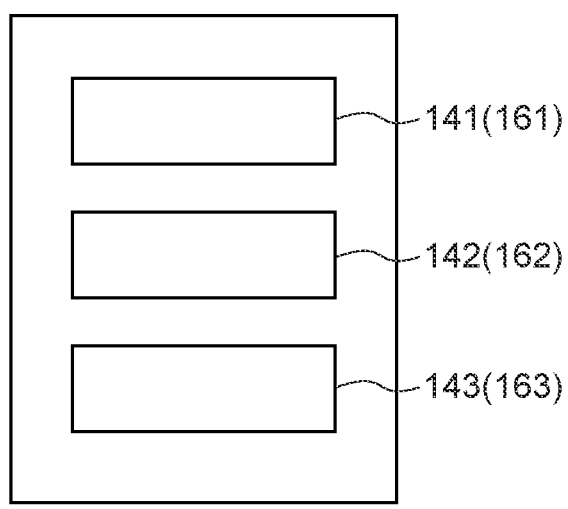
FIG. 4 is a diagram illustrating customer history data recorded in the management server illustrated in FIG. 2.
FIG. 5 is a functional block diagram of an operation terminal of the vehicle dispatch support system illustrated in FIG. 1.

FIG. 5 is a block diagram illustrating an example of functional configuration of the operation terminal 14 and the mobile terminal 16. The operation terminal 14 includes a transmission/reception section 141, a display control section 142, and a time determination section 143 as functional configuration. Similarly, the mobile terminal 16 includes a transmission/reception section 161, a display control section 162, and a time determination section 163 as functional configuration. The transmission/reception sections 141, 161, the display control sections 142, 162, and the time determination sections 143, 163 are implemented by the corresponding CPU reading and executing a program stored in the corresponding ROM.

The transmission/reception section 141 transmits and receives information between itself and the transmission/reception section 121 of the management server 12 over the LAN. The transmission/reception section 161 performs wireless communication with the transmission/reception section 121 of the management server 12.

The display control section 142 controls the display section 15. For example, the display control section 142 causes the display section 15 to display information received from the transmission/reception section 121 by the transmission/reception section 141, and information input via the touch panel. The display control section 142 also forwards information input via the touch panel of the display section 15 to the transmission/reception section 141, and causes the transmission/reception section 141 to transmit this information to the transmission/reception section 121.

The display control section 162 controls the display section 17. For example, the display control section 162 causes the display section 17 to display information received from the transmission/reception section 121 by the transmission/reception section 161 and information input via the touch panel of the mobile terminal 16. The display control section 162 also forwards information input via the touch panel to the transmission/reception section 161, and causes the transmission/reception section 161 to transmit this information to the transmission/reception section 121.

Functionality of the time determination sections 143, 163 will be described later.

Figure 6:
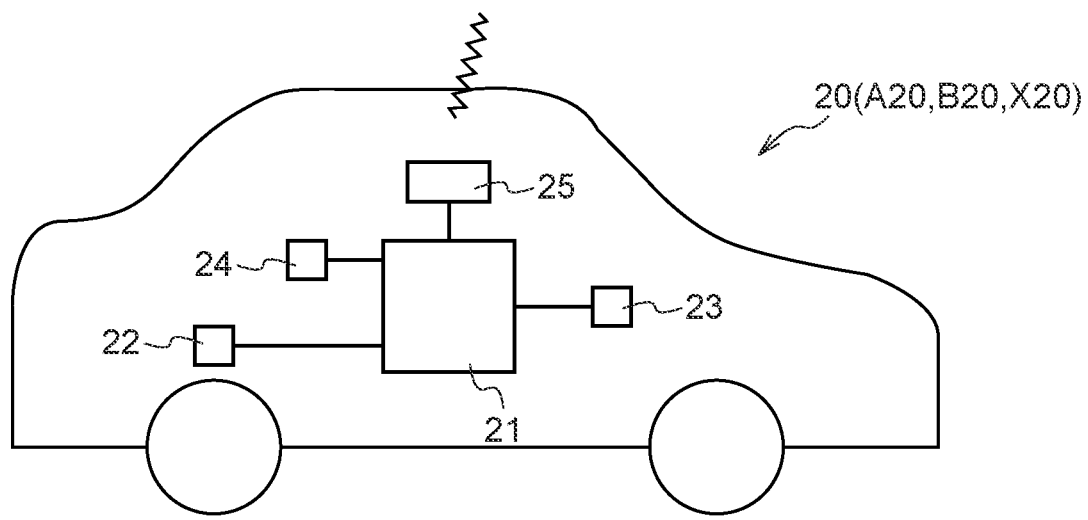
FIG. 6 is a diagram illustrating a vehicle employed in the vehicle dispatch support system illustrated in FIG. 1.

FIG. 6 illustrates a vehicle 20 owned by the car rental company. The vehicle 20 includes an electronic control unit (ECU) 21, wheel speed sensors 22, an accelerator position sensor 23, a pedal pressure sensor 24, and a wireless communication device 25. The wheel speed sensors 22, the accelerator position sensor 23, the pedal pressure sensor 24, and the wireless communication device 25 are connected to the ECU 21. The ECU 21 is configured including a CPU, a ROM, a RAM, a storage, a communication I/F, and an input/output I/F. The CPU, the ROM, the RAM, the storage, the communication I/F, and the input/output I/F of the ECU 21 are connected together so as to be capable of communicating with each other through a bus.

The plural wheel speed sensors 22 detect the wheel speeds of the respective wheels of the vehicle 20 and output detection signals to the ECU 21. The ECU 21 computes an acceleration Ac and a deceleration Dc of the vehicle 20 based on the signals received from the respective wheel speed sensors 22 each time a predetermined duration elapses.

Each time a predetermined duration elapses, the accelerator position sensor 23 outputs a signal corresponding to an accelerator position Oac that changes as an accelerator pedal (not illustrated in the drawings) is pressed by the driver of the vehicle 20 to the ECU 21.

Each time a predetermined duration elapses, the pedal pressure sensor 24 outputs a detection signal indicating a brake pressing force Fb input to a brake pedal (not illustrated in the drawings) by the driver of the vehicle 20 to the ECU 21.

The wireless communication devices 25 of all the vehicles 20 owned by the car rental company employ wireless communication to transmit information indicating the acceleration Ac, the deceleration Dc, the accelerator position Oac, and the brake pressing force Fb to the wireless communication device 13, in association with the customer ID of the customer driving the vehicle 20, the vehicle ID, and the date and time. This information indicating the acceleration Ac, the deceleration Dc, the accelerator position Oac, and the brake pressing force Fb is also referred to collectively as "vehicle information" in the following explanation. The vehicle information received by the wireless communication device 13 is then recorded in the storage 12D. For example, when the position of the ignition switch of a vehicle 20 has been switched from an ON position to an OFF position, the wireless communication device 25 of that vehicle 20 transmits all of the vehicle information acquired while the ignition switch was in the ON position to the wireless communication device 13. Alternatively, the wireless communication device 25 may transmit the vehicle information to the wireless communication device 13 each time a predetermined duration elapses while the position of the ignition switch of the vehicle 20 remains at the ON position. Alternatively, the vehicle information for the vehicle 20 may be recorded in a recording device (for example USB memory), and the vehicle information recorded in the recording device then may be recorded in the storage 12D.

Operation and Effects

Next, explanation follows regarding operation and effects of the present exemplary embodiment.

Figure 7:
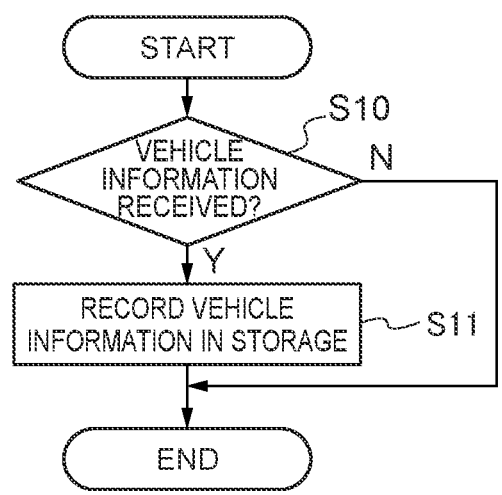
FIG. 7 is a flowchart illustrating a flow of processing executed by the management server illustrated in FIG. 1.
Figure 8:
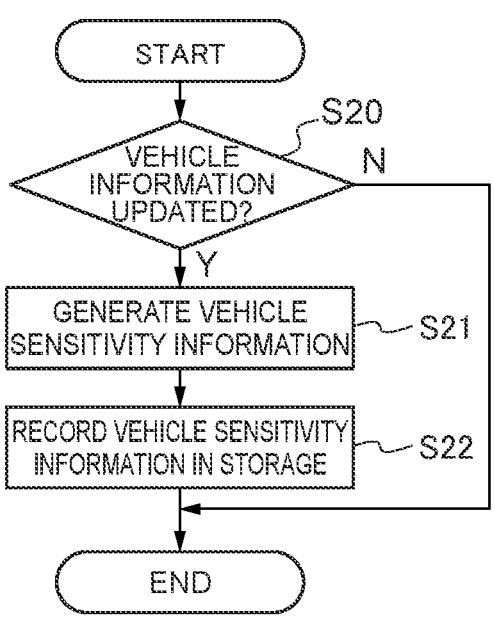
FIG. 8 is a flowchart illustrating a flow of processing executed by the management server illustrated in FIG. 1.
Figure 10:
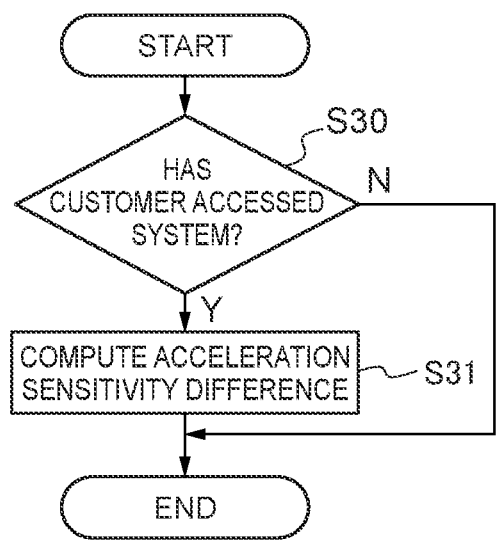
FIG. 10 is a flowchart illustrating a flow of processing executed by the management server illustrated in FIG. 1.

First, explanation follows regarding a flow of processing performed by the management server 12 of the present exemplary embodiment, with reference to the flowcharts of FIG. 7, FIG. 8, and FIG. 10.

The management server 12 repeats the processing illustrated in the flowchart of FIG. 7 each time a predetermined duration elapses.

First, at step S10, the transmission/reception section 121 of the management server 12 determines whether or not vehicle information has been received.

In cases in which a determination of YES is made at step S10, the management server 12 proceeds to step S11, and records the received vehicle information in the storage 12D.

When the processing of step S11 has been completed, or when a determination of NO is made at step S10, the management server 12 ends the current round of processing of the flowchart of FIG. 7.

The management server 12 repeats the processing illustrated in the flowchart of FIG. 8 each time a predetermined duration elapses.

First, at step S20, the sensitivity computation section 122 of the management server 12 determines whether or not vehicle information relating to at least one vehicle ID has been newly recorded in the storage 12D.

In cases in which a determination of YES is made at step S20, the management server 12 proceeds to step S21, and the sensitivity computation section 122 generates (updates) vehicle sensitivity information relating to the corresponding vehicle ID based on the updated vehicle information. The vehicle sensitivity information of the present exemplary embodiment corresponds to acceleration sensitivity information.

Figure 9:
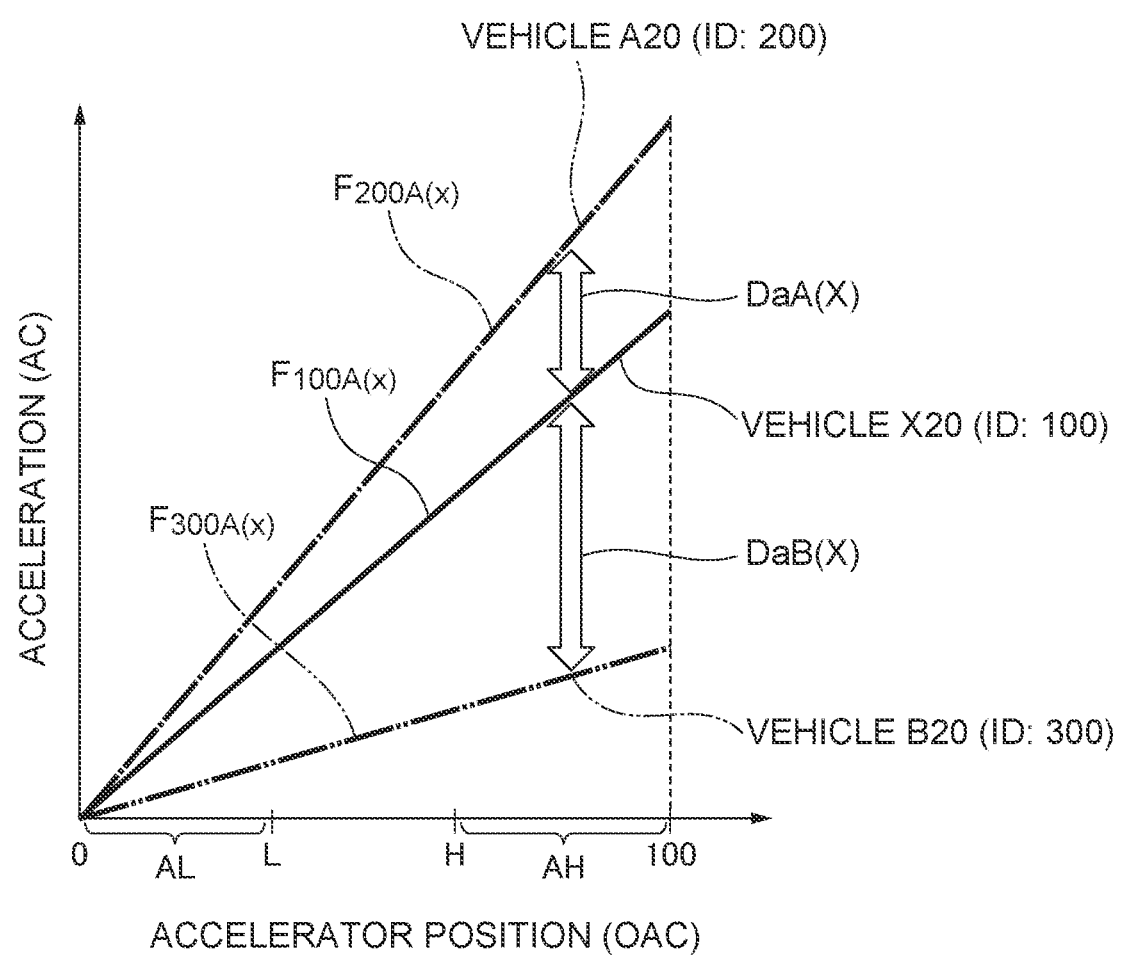
FIG. 9 is a graph expressing acceleration sensitivity of plural vehicles.

FIG. 9 is a graph (function) expressing the acceleration sensitivities of three of the vehicles 20 (ID: 100, ID: 200, ID: 300). In the following explanation, the vehicle 20 with the vehicle ID 200 is also referred to as the vehicle A20 (candidate vehicle), and the vehicle 20 with the vehicle ID 300 is also referred to as the vehicle B20 (candidate vehicle). Note that the vehicles 20 with the IDs 200, 300 are vehicles that a customer accessing the system 10 (also referred to hereafter as the "accessing customer") has not ridden before. The acceleration sensitivity expresses a correlation between the accelerator position Oac (horizontal axis) and the acceleration Ac (vertical axis). For example, the sensitivity computation section 122 plots all of the accelerator positions Oac and all of the accelerations Ac of the respective vehicles 20 as recorded in the storage 12D, and then employs the least squares method to obtain the functions (approximation formulae) illustrated in FIG. 9 based on all of the plotted points. $F_{100A}(x)$ in FIG. 9 is a function expressing the acceleration sensitivity of the vehicle X20. Similarly, $F_{200A}(x)$ is a function expressing the acceleration sensitivity of the vehicle A20, and $F_{300A}(x)$ is a function expressing the acceleration sensitivity of the vehicle B20. The sensitivity computation section 122 further classifies vehicle speeds of the respective vehicles 20 into three regions (low speed region, mid-speed region, and high speed region), and obtains a graph (function) expressing acceleration sensitivity in each of these regions.

When the processing of step S21 has been completed, the management server 12 proceeds to step S22, and records (updates) the acceleration sensitivity information that is information relating to the acceleration sensitivity as illustrated in FIG. 9 in the storage 12D.

When the processing of step S22 has been completed, or when a determination of NO is made at step S20, the management server 12 ends the current round of processing of the flowchart of FIG. 8.

The management server 12 repeats the processing illustrated in the flowchart of FIG. 10 each time a predetermined duration elapses.

First, at step S30, the sensitivity difference computation section 123 of the management server 12 determines whether or not a customer has accessed the system 10 using the display section 15 (touch panel) of the operation terminal 14 or the mobile terminal 16 on which the rental car reservation application has been started up. In the following explanation, "terminal 14 or 16" is used to signify at least one of the operation terminal 14 or the mobile terminal 16.

When a determination of YES is made at step S30, the management server 12 proceeds to step S31, and the sensitivity difference computation section 123 computes an acceleration sensitivity difference between the vehicle X20 that there is a record of the accessing customer riding in the past and each of the other vehicles A20, B20 for each of the three regions, based on the updated acceleration sensitivity information. Namely, as illustrated in FIG. 9, Equations 1 and 2 are employed to compute an acceleration sensitivity difference DaA(X) between the vehicle X20 and the vehicle A20, and an acceleration sensitivity difference DaB(X) between the vehicle X20 and the vehicle B20. The acceleration sensitivity difference DaA(X) and the acceleration sensitivity difference DaB(X) thus computed are then recorded in the storage 12D.

$$DaA(X)=2\times\int_0^L DaA(x)dx + \int_L^H DaA(x)dx + 1.5\times\int_H^{100} DaA(x)dx \quad \text{Equation (1)}$$

$$DaB(X)=2\times\int_0^L DaB(x)dx + \int_L^H DaB(x)dx + 1.5\times\int_H^{100} DaB(x)dx \quad \text{Equation (2)}$$

The sensitivity difference computation section 123 then integrates $DaA(x)=F_{200A}(x)-F_{100A}(x)$ to compute the acceleration sensitivity difference DaA(X). The sensitivity difference computation section 123 also integrates $DaB(x)=F_{100A}(x)-F_{300A}(x)$ to compute the acceleration sensitivity difference DaB(X).

Three non-overlapping ranges of accelerator position are set in a range of accelerator positions Oac (spanning from 0 to 100) illustrated in FIG. 9. Of the three accelerator position ranges, an accelerator position range from "0" to a predetermined value of "L (low)" is defined as a "low accelerator position range AL", and an accelerator position range from a predetermined value of "H (high)" to "100" is defined as a "high accelerator position range AH". As in Equations 1 and 2, a weighting coefficient of 2 is used to multiply the integral value in the low accelerator position range AL, and a weighting coefficient of 1.5 is used to multiply the integral value in the high accelerator position range AH. A weighting coefficient of 1 is used to multiply the integral value in an accelerator position range that is neither the low accelerator position range AL nor the high accelerator position range AH.

For example, in cases in which a vehicle 20 in a stationary state starts moving or in cases in which the vehicle 20 transitions to a parked state from low speed travel, the accelerator position Oac is likely to be in the low accelerator position range AL. In such cases, if the accelerator position Oac enters the low accelerator position range AL in a vehicle 20 that has an acceleration sensitivity inappropriate for the driver, there is a strong possibility that the customer may be unable to obtain their desired operating feel. Namely, the accelerator position Oac in the low accelerator position range AL in such cases has a large effect on the acceleration sensitivity of the vehicle 20. Accordingly, the weighting coefficient of 2 is used to multiply the integral value in the low accelerator position range AL. Note that a value other than 2 may be adopted as the weighting coefficient used to multiply the integral value in the low accelerator position range AL.

For example, in cases in which the vehicle 20 starts moving in order to turn right after stopping at a crossroad in a country where traffic drives on the left hand side, or in cases in which the vehicle 20 joins an expressway after traveling on a general road, the accelerator position Oac is likely to be in the high accelerator position range AH. In such cases, if the accelerator position Oac enters the high accelerator position range AH in a vehicle 20 that has an acceleration sensitivity inappropriate for the driver, there is a strong possibility that the customer may be unable to obtain their desired operating feel. Namely, the accelerator position Oac in the high accelerator position range AH in such cases has a large effect on the acceleration sensitivity of the vehicle 20. Accordingly, the weighting coefficient of 1.5 is used to multiply the integral value in the high accelerator position range AH. Note that a value other than 1.5 may be adopted as the weighting coefficient used to multiply the integral value in the high accelerator position range AH.

In the present exemplary embodiment, the combined value of the acceleration sensitivity difference DaA(X) in each of the three regions is smaller than the combined value of the acceleration sensitivity difference DaB(X) in each of the three regions. Namely, the acceleration sensitivity of the vehicle A20 is closer to the acceleration sensitivity of the vehicle X20 than the acceleration sensitivity of the vehicle B20.

When the processing of step S31 has been completed, or when a determination of NO is made at step S30, the management server 12 ends the current round of processing of the flowchart of FIG. 10.

Figures 11, 12:
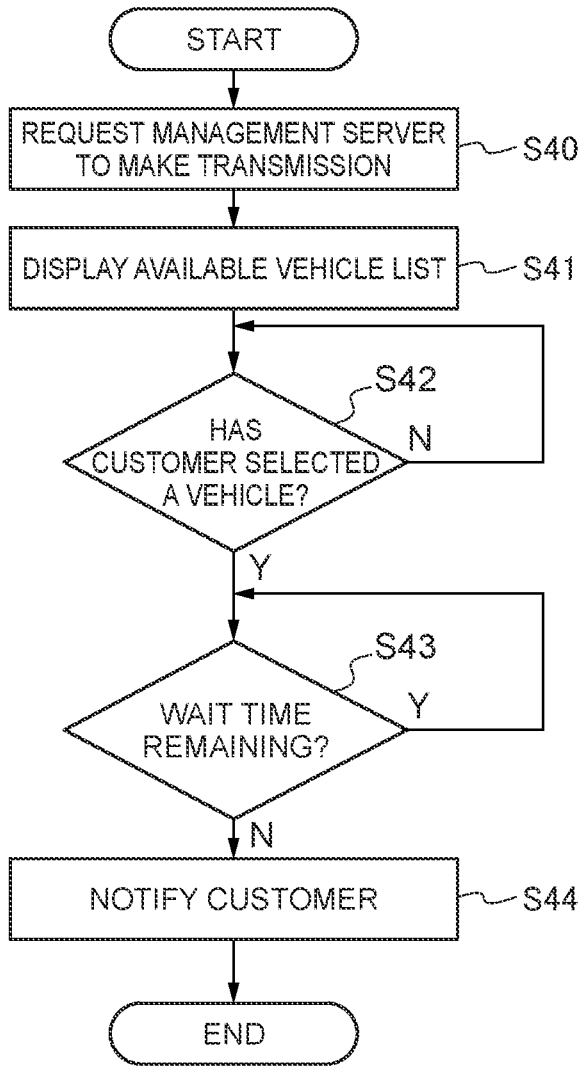
FIG. 11 is a flowchart illustrating a flow of processing executed by the operation terminal or the mobile terminal.
FIG. 12 is a diagram illustrating an available vehicle list displayed on the operation terminal or the mobile terminal.

When a customer accesses the system 10 using the display section 15 or the display section 17, the terminal 14 or 16 repeats the processing illustrated in the flowchart of FIG. 11 each time a predetermined duration elapses.

First, at step S40, at least one of the transmission/reception section 141 of the operation terminal 14 or the transmission/reception section 161 of the mobile terminal 16 requests the transmission/reception section 121 to transmit data relating to an available vehicle list 19A or 19B (see FIG. 12 and FIG. 13) corresponding to the customer ID of the accessing customer. Vehicles (candidate vehicles) with vehicle IDs included in the available vehicle lists 19A, 19B correspond to vehicles that are not currently being ridden by any other customer and have a wait time (time until being available to use) corresponding to a predetermined duration or less. Note that vehicles that the customer has ridden in the past may be included in the available vehicle lists 19A, 19B as candidate vehicles.

When this is performed, the transmission/reception section 121 of the management server 12 selects one out of the available vehicle lists 19A, 19B to transmit according to the presence or absence and type of evaluation in the customer history data 18 corresponding to the customer ID of that customer, as recorded in the storage 12D. Namely, in a case in which there is either a "positive evaluation" or no evaluation in the customer history data 18, the transmission/ reception section 121 transmits the available vehicle list 19A illustrated in FIG. 12. On the other hand, in cases in which there is a "negative evaluation" in the customer history data 18, the transmission/reception section 121 transmits the available vehicle list 19B illustrated in FIG. 13.

For example, in a case in which the customer gave an evaluation of "1" (positive evaluation) for the vehicle X20 that the customer has ridden in the past as illustrated in FIG. 4, at step S41, the transmission/reception section 141 or 161 of the terminal 14 or 16 receives data relating to the available vehicle list 19A. The display control section 142 or 162 then displays the available vehicle list 19A on the display section 15 or 17. The available vehicle list 19A includes a "vehicle ID", "vehicle behavior similarity level", "wait time", "recommendation level", and "select button" for each of the vehicles 20 that are currently available.

The "vehicle behavior similarity level" serves as one type of sensitivity difference-related information, and expresses a sensitivity difference between the vehicle X20 that the customer has ridden in the past and each of the vehicles A20, B20. The smaller the sensitivity difference, the higher the similarity level. For example, the combined value of the acceleration sensitivity difference DaA(X) for the three regions computed at step S31 is smaller than the combined value of the acceleration sensitivity difference DaB(X) for the three regions. The vehicle A20 is therefore displayed as being "similar" in terms of the "vehicle behavior similarity level" whereas the vehicle B20 is displayed as being "not similar" in terms of the "vehicle behavior similarity level" in the available vehicle list 19A.

The "wait time" is computed by the wait time computation section 125 based on the usage status information.

The "recommendation level (recommendation information)" serves as one type of sensitivity difference-related information, and is generated by the determination section 126 based on the "vehicle behavior similarity level" and the "wait time". In cases in which the vehicle X20 (comparison vehicle) has been positively evaluated, the "recommendation level" becomes higher as the "vehicle behavior similarity level" becomes higher, and the "recommendation level" also becomes higher as the "wait time" becomes shorter. In cases in which the vehicle X20 (comparison vehicle) has been negatively evaluated, the "recommendation level" becomes higher as the "vehicle behavior similarity level" becomes lower, and the "recommendation level" also becomes higher as the "wait time" becomes shorter.

In this case, the acceleration sensitivity of the vehicle X20 that the customer has positively evaluated and the acceleration sensitivity of the vehicle A20 are similar, whereas the acceleration sensitivity of the vehicle X20 and the acceleration sensitivity of the vehicle B20 are not similar. Accordingly, the recommendation level (1) of the vehicle A20 is higher than the recommendation level (2) of the vehicle B20, even though the wait time of the vehicle A20 is longer than the wait time of the vehicle B20.

Conversely, it is assumed that the customer has negatively evaluated the vehicle X20. In this case, at step S41, the transmission/reception section 141 or 161 of the terminal 14 or 16 receives data relating to the available vehicle list 19B. The display control section 142 or 162 then displays the available vehicle list 19B on the display section 15 or 17.

In this case, the acceleration sensitivity of the vehicle X20 that the customer has negatively evaluated and the acceleration sensitivity of the vehicle A20 are similar, whereas the acceleration sensitivity of the vehicle X20 and the acceleration sensitivity of the vehicle B20 are not similar. Accordingly, from the perspective of acceleration sensitivity, the vehicle B20 is more appropriate for the customer than the vehicle A20. Moreover, the wait time for the vehicle B20 is shorter than the wait time for the vehicle A20. Accordingly, in the available vehicle list 19B, the recommendation level (1) of the vehicle B20 is higher than the recommendation level (2) of the vehicle A20.

On completing the processing of step S41, the terminal 14 or 16 proceeds to step S42, and the time determination section 143 or 163 determines whether or not the customer has selected any of the vehicles 20 using the corresponding select button. In cases in which a determination of NO is made at step S42, the time determination section 143 or 163 repeats the processing of step S42.

In cases in which a determination of YES is made at step S42, the time determination section 143 or 163 proceeds to step S43. On proceeding to step S43, the time determination section 143 or 163 determines whether or not any wait time for the vehicle 20 selected by the customer is remaining. The time determination section 143 or 163 repeats the processing of step S43 until a determination of NO is made at step S43.

On making a determination of NO at step S43, the terminal 14 or 16 proceeds to step S44, and the display section 15 or 17 displays that the selected vehicle 20 has become available for use.

When the processing of step S44 has been completed, the terminal 14 or 16 ends the current round of processing of the flowchart of FIG. 11.

As described above, in the system 10, the vehicle dispatch support method, and the non-transitory recording medium of the present exemplary embodiment, the sensitivity difference computation section 123 computes an acceleration sensitivity difference that is the difference between acceleration sensitivities of plural of the vehicles 20. Moreover, the display section 15 or 17 of the terminal 14 or 16 displays the vehicle behavior similarity level (sensitivity difference-related information) that is information based on the acceleration sensitivity difference. Accordingly, in cases in which the vehicle X20 (comparison vehicle) has been positively evaluated, the customer looking at the display section 15 or 17 is able to select a vehicle having an acceleration sensitivity similar to that of the vehicle X20. In cases in which the vehicle X20 has been negatively evaluated, the customer looking at the display section 15 or 17 is able to select a vehicle having an acceleration sensitivity that is not similar to that of the vehicle X20. This enables the customer to select a vehicle 20 with an acceleration sensitivity appropriate for the customer.

Moreover, in the system 10, the vehicle dispatch support method, and the non-transitory recording medium of the present exemplary embodiment, the acceleration sensitivity difference is computed by weighting according to the magnitude of the accelerator position Oac. The acceleration sensitivity of the selected vehicle 20 is therefore more likely to be an acceleration sensitivity appropriate for the customer when the accelerator position Oac is in the low accelerator position range AL or the high accelerator position range AH.

Second Exemplary Embodiment

Figures 13, 14:
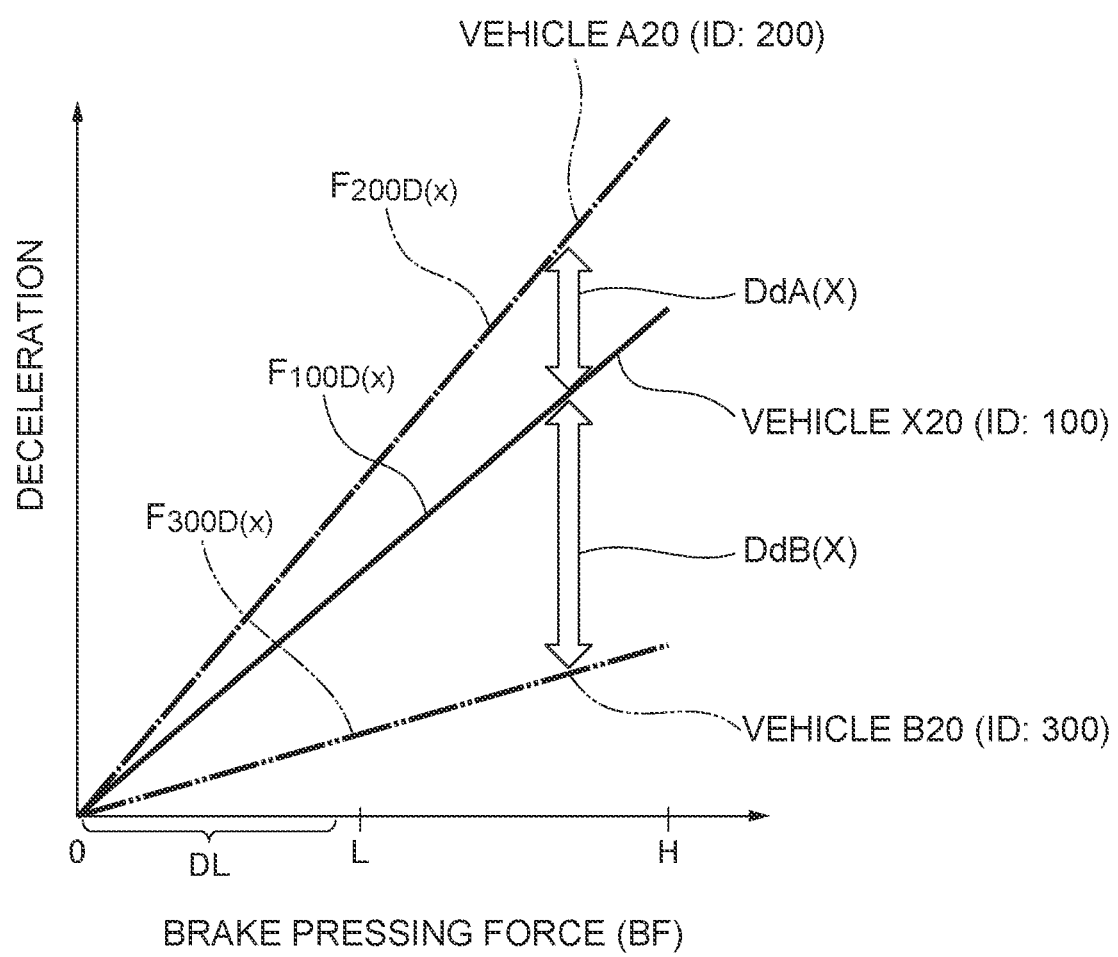
FIG. 13 is a diagram illustrating an available vehicle list displayed on the operation terminal or the mobile terminal.
FIG. 14 is a graph expressing deceleration sensitivity of plural vehicles employed in a vehicle dispatch support system according to a second exemplary embodiment.
Figure 15:
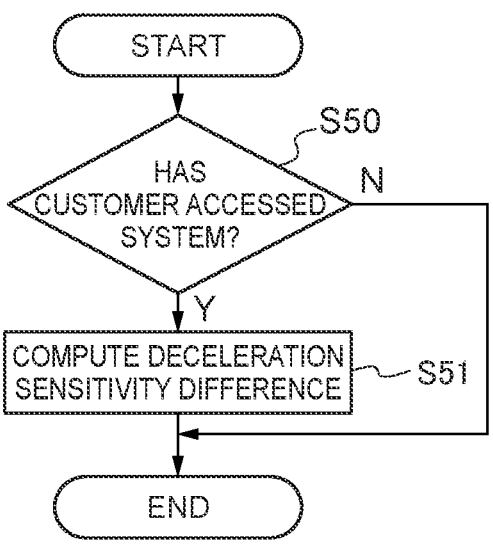
FIG. 15 is a flowchart illustrating a flow of processing executed by the management server of the vehicle dispatch support system according to the second exemplary embodiment.

Next, explanation follows regarding a second exemplary embodiment of the system 10, the vehicle dispatch support method, and the non-transitory recording medium according to the present disclosure, with reference to FIG. 14 and FIG. 15. Note that configuration similar to that of the first exemplary embodiment is allocated the same reference numerals, and explanation thereof is omitted where appropriate.

At step S21 in FIG. 8, the management server 12 of the present exemplary embodiment generates vehicle sensitivity information based on the updated vehicle information. The vehicle sensitivity information of the present exemplary embodiment is deceleration sensitivity information.

FIG. 14 is a graph (function) expressing the deceleration sensitivities of three of the vehicles, namely the vehicle X20, the vehicle A20, and the vehicle B20. The deceleration sensitivity expresses a correlation between the brake pressing force Fb (horizontal axis) and the deceleration Dc (vertical axis). For example, the sensitivity computation section 122 plots all of the brake pressing forces Fb and all of the decelerations Dc of the respective vehicles 20 as recorded in the storage 12D, and then employs the least squares method to obtain the functions (approximation formulae) illustrated in FIG. 14 based on all of the plotted points. $F_{100D}(x)$ in FIG. 14 is a function expressing the deceleration sensitivity of the vehicle X20. Similarly, $F_{200D}(x)$ is a function expressing the deceleration sensitivity of the vehicle A20, and $F_{300D}(x)$ is a function expressing the deceleration sensitivity of the vehicle B20. The sensitivity computation section 122 further classifies vehicle speeds of the respective vehicles 20 into three regions (low speed region, mid-speed region, and high speed region), and obtains a graph (function) expressing deceleration sensitivity in each of these regions.

The management server 12 of the present exemplary embodiment executes the processing illustrated in the flowchart of FIG. 15 each time a predetermined duration elapses.

The processing of step S50 is the same as that of step S30.

When a determination of YES is made at step S50, at step S51, the sensitivity difference computation section 123 computes an deceleration sensitivity difference between the vehicle X20 and each of the other vehicles A20, B20 for each of the three regions, based on the updated deceleration sensitivity information. Namely, as illustrated in FIG. 14, Equations 3 and 4 are employed to compute a deceleration sensitivity difference DdA(X) between the vehicle X20 and the vehicle A20, and a deceleration sensitivity difference DdB(X) between the vehicle X20 and the vehicle B20. The deceleration sensitivity difference DdA(X) and the deceleration sensitivity difference DdB(X) thus computed are then recorded in the storage 12D.

$$DdA(X)=2\times\int_0^L DdA(x)dx+\int_L^H DdA(x)dx \quad \text{Equation (3)}$$

$$DdB(X)=2\times\int_0^L DdB(x)dx+\int_L^H DdB(x)dx \quad \text{Equation (4)}$$

The sensitivity difference computation section 123 then integrates $DdA(x)=F_{200D}(x)-F_{100D}(x)$ to compute the deceleration sensitivity difference DdA(X). The sensitivity difference computation section 123 also integrates $DdB(x)=F_{100D}(x)-F_{300D}(x)$ to compute the deceleration sensitivity difference DdB(X).

A brake pressing force range of the brake pressing force Bf illustrated in FIG. 14 from 0 to a predetermined value of "L (low)" is defined as a "low pressing force range DL". Note that a predetermined value of "H (high)" on the horizontal axis represents a greater brake pressing force than "L". As in Equations 3 and 4, a weighting coefficient of 2 is used to multiply the integral value in the low pressing force range DL. A weighting coefficient of 1 is used to multiply the integral values in all brake pressing force ranges other than the low pressing force range DL.

For example, in cases in which the vehicle 20 transitions to a stationary state from low speed travel, the brake pressing force Bf is likely to be in the low pressing force range DL. In such cases, if the brake pressing force Bf enters the low pressing force range DL in a vehicle 20 that has a deceleration sensitivity inappropriate for the driver, there is a strong possibility that the customer may be unable to obtain their desired operating feel. Namely, the vehicle 20 may draw closer to a vehicle ahead than the customer was expecting. Alternatively, a following vehicle may draw closer to the vehicle 20 than the customer was expecting. Accordingly, the weighting coefficient of 2 is used to multiply the integral value in the low pressing force range DL. Note that a value other than 2 may be adopted as the weighting coefficient used to multiply the integral value in the low pressing force range DL.

In the present exemplary embodiment, the combined value of the deceleration sensitivity difference DdA(X) in each of the three regions is smaller than the combined value of the deceleration sensitivity difference DdB(X) in each of the three regions. Namely, the deceleration sensitivity of the vehicle A20 is closer to the deceleration sensitivity of the vehicle X20 than the deceleration sensitivity of the vehicle B20.

When the processing of step S51 has been completed, or when a determination of NO is made at step S50, the management server 12 ends the current round of processing of the flowchart of FIG. 15.

In the present exemplary embodiment, when a customer accesses the system 10, the terminal 14 or 16 repeats the processing illustrated in the flowchart of FIG. 11 each time a predetermined duration elapses.

For example, in a case in which a customer gave an evaluation of "1" (positive evaluation) for the vehicle X20 that the customer has ridden in the past, at step S41, the transmission/reception section 141 or 161 of the terminal 14 or 16 receives data relating to the available vehicle list 19A.

In this case, the deceleration sensitivity of the vehicle X20 that the customer has positively evaluated and the deceleration sensitivity of the vehicle A20 are similar, whereas the deceleration sensitivity of the vehicle X20 and the deceleration sensitivity of the vehicle B20 are not similar. Accordingly, the recommendation level (1) of the vehicle A20 is higher than the recommendation level (2) of the vehicle B20, even though the wait time of the vehicle A20 is longer than the wait time of the vehicle B20.

Conversely, it is assumed that the customer has negatively evaluated the vehicle X20. In this case, at step S41, the transmission/reception section 141 or 161 of the terminal 14 or 16 receives data relating to the available vehicle list 19B. The display control section 142 or 162 then displays the available vehicle list 19B on the display section 15 or 17.

In this case, the deceleration sensitivity of the vehicle X20 that the customer has negatively evaluated and the deceleration sensitivity of the vehicle A20 are similar, whereas the deceleration sensitivity of the vehicle X20 and the deceleration sensitivity of the vehicle B20 are not similar. Accordingly, from the perspective of deceleration sensitivity, the vehicle B20 is more appropriate for the customer than the vehicle A20. Moreover, the wait time for the vehicle B20 is shorter than the wait time for the vehicle A20. Accordingly, in the available vehicle list 19B, the recommendation level (1) of the vehicle B20 is higher than the recommendation level (2) of the vehicle A20.

As described above, in the system 10, the vehicle dispatch support method, and the non-transitory recording medium of the present exemplary embodiment, the sensitivity difference computation section 123 computes the deceleration sensitivity difference that is the difference between deceleration sensitivities of plural of the vehicles 20. Moreover, the display section 15 or 17 of the terminal 14 or 16 displays the vehicle behavior similarity level (sensitivity difference-related information) that is information based on the deceleration sensitivity difference. Accordingly, in cases in which the vehicle X20 (comparison vehicle) has been positively evaluated, the customer looking at the display section 15 or 17 is able to select a vehicle having a deceleration sensitivity similar to that of the vehicle X20. In cases in which the vehicle X20 has been negatively evaluated, the customer looking at the display section 15 or 17 is able to select a vehicle having a deceleration sensitivity that is not similar to that of the vehicle X20. This enables the customer to select a vehicle 20 with an appropriate deceleration sensitivity for the customer.

Moreover, in the system 10, the vehicle dispatch support method, and the non-transitory recording medium of the present exemplary embodiment, the deceleration sensitivity difference is computed by weighting according to the level of the brake pressing force Bf. The deceleration sensitivity of the selected vehicle 20 is therefore more likely to be a deceleration sensitivity appropriate for the customer when the brake pressing force Bf is in the low pressing force range DL.

Although explanation has been given regarding the system 10, the vehicle dispatch support method, and the non-transitory recording medium according to the first and second exemplary embodiments, various modifications may be implemented as appropriate to the system 10, the vehicle dispatch support method, and the non-transitory recording medium within a range not departing from the spirit of the present disclosure.

For example, the driving sensitivity of the vehicle may be a sensitivity other than the acceleration sensitivity or the deceleration sensitivity. For example, steering sensitivity of an electric power steering (EPS) of a vehicle may be employed as the driving sensitivity. A function expressing the steering sensitivity may, for example, be expressed by steering torque on the steering wheel (horizontal axis) and a vehicle yaw rate (vertical axis).

The agent (executant) executing the vehicle dispatch support method may, for example, be a provider (organization) of a car matching service that does not own its own vehicles but allows vehicles owned by customers (private cars) to be used by other customers. In such cases, for example, the management server 12 may be installed on the premises of a company providing the car matching service, and a customer may access the management server 12 using a mobile terminal 16. In such cases, a private car belonging to the customer may be registered in the customer history data 18 as a "comparison vehicle". Note that in such cases, the comparison vehicle (private car) is eliminated from the candidate vehicles.

The weightings of Equations 1, 2, 3, and 4 do not have to be performed.

Sensitivity differences of plural types of driving sensitivity (acceleration sensitivity difference, deceleration sensitivity difference, and steering sensitivity difference) may be used to obtain the "vehicle behavior similarity level".

The sensitivity difference of the driving sensitivity may be computed for each of two vehicle speed regions (low speed region and high speed region). Alternatively, the sensitivity differences of respective driving sensitivities may be computed in just one computation, without performing computations for each vehicle speed region.

Sensitivity differences that are differences between driving sensitivities of plural comparison vehicles and driving sensitivities of plural candidate vehicles may be obtained. For example, it is assumed that two comparison vehicles are present, and a customer has evaluated one of these vehicles highly than the other of these vehicles. In such cases, a candidate vehicle having a small sensitivity difference to the comparison vehicle having the higher evaluation may be given a higher "recommendation level" than a candidate vehicle having a small sensitivity difference to the comparison vehicle having the lower evaluation (assuming the same wait time).

What is claimed is:

1. A vehicle dispatch support system, comprising:
a recording section at which comparison vehicle sensitivity information and candidate vehicle sensitivity information are recorded, the comparison vehicle sensitivity information being information relating to a driving sensitivity of a comparison vehicle that is a vehicle that a user has ridden in the past, and the candidate vehicle sensitivity information being information relating to a driving sensitivity of each of a plurality of candidate vehicles;
a processor coupled to the recording section and configured to compute a sensitivity difference, which is a difference between the driving sensitivity expressed by the comparison vehicle sensitivity information and the driving sensitivity expressed by the candidate vehicle sensitivity information; and
a display section configured to display sensitivity difference-related information, which is information based on the sensitivity difference;
wherein the processor is configured to compute the sensitivity difference as a difference between acceleration sensitivities expressing respective correlations between accelerator position and acceleration of the comparison vehicle and the candidate vehicles;
wherein the processor is configured to compute the sensitivity difference by employing a weighting coefficient that is set for each of a plurality of non-overlapping ranges of accelerator position; and
wherein each time that a predetermined duration elapses, an accelerator position sensor outputs a signal corresponding to an accelerator position that changes as an accelerator pedal is pressed by a driver of a first vehicle.

2. A vehicle dispatch support system, comprising:
a recording section at which comparison vehicle sensitivity information and candidate vehicle sensitivity information are recorded, the comparison vehicle sensitivity information being information relating to a driving sensitivity of a comparison vehicle that is a vehicle that a user has ridden in the past, and the candidate vehicle sensitivity information being information relating to a driving sensitivity of each of a plurality of candidate vehicles;

a processor coupled to the recording section and configured to compute a sensitivity difference, which is a difference between the driving sensitivity expressed by the comparison vehicle sensitivity information and the driving sensitivity expressed by the candidate vehicle sensitivity information; and a display section configured to display sensitivity difference-related information, which is information based on the sensitivity difference;

wherein the processor is configured to compute the sensitivity difference as a difference between deceleration sensitivities expressing respective correlations between brake pressing force and deceleration of the comparison vehicle and the candidate vehicles;

wherein the processor is configured to compute the sensitivity difference by employing a weighting coefficient that is set for each of a plurality of non-overlapping ranges of brake pressing force; and wherein each time that a predetermined duration elapses, an accelerator position sensor outputs a signal corresponding to an accelerator position that changes as an accelerator pedal is pressed by a driver of a first vehicle.

3. The vehicle dispatch support system of claim 1, wherein:

the processor is configured to compute a plurality of the sensitivity differences based on the driving sensitivity expressed by the comparison vehicle sensitivity information and on the driving sensitivity expressed by the candidate vehicle sensitivity information of the plurality of candidate vehicles; and the display section is configured to display recommendation information as the sensitivity difference-related information, the recommendation information being generated based on the plurality of computed sensitivity differences and indicating which of the candidate vehicles is being recommended to the user.

4. The vehicle dispatch support system of claim 3, wherein, in cases in which an evaluation result of the comparison vehicle by the user is a predetermined evaluation level or higher, the candidate vehicles are more readily recommended to the user, the smaller the sensitivity difference.

5. A vehicle dispatch support method comprising, using a processor:

recording comparison vehicle sensitivity information and candidate vehicle sensitivity information, the comparison vehicle sensitivity information being information relating to a driving sensitivity of a comparison vehicle that is a vehicle that a user has ridden in the past, and the candidate vehicle sensitivity information being information relating to a driving sensitivity of each of a plurality of candidate vehicles;

computing a sensitivity difference, which is a difference between the driving sensitivity expressed by the comparison vehicle sensitivity information and the driving sensitivity expressed by the candidate vehicle sensitivity information; and displaying, at a display section, sensitivity difference-related information, which is information based on the sensitivity difference;

wherein the sensitivity difference is computed as a difference between acceleration sensitivities expressing respective correlations between accelerator position and acceleration of the comparison vehicle and the candidate vehicles;

wherein the sensitivity difference is computed by employing a weighting coefficient that is set for each of a plurality of non-overlapping ranges of accelerator position and wherein each time that a predetermined duration elapses, an accelerator position sensor outputs a signal corresponding to an accelerator position that changes as an accelerator pedal is pressed by a driver of a first vehicle.

* * * * *